(12) United States Patent
Albrecht

(10) Patent No.: US 6,356,190 B1
(45) Date of Patent: Mar. 12, 2002

(54) BRAKE EARLY WARNING SYSTEM AND METHOD OF USE

(75) Inventor: Don Albrecht, Santa Monica, CA (US)

(73) Assignee: The Donald Albrecht Revocable Trust, Santa Monica, CA (US)

( * ) Notice: Subject to any disclaimer, the term of this patent is extended or adjusted under 35 U.S.C. 154(b) by 0 days.

(21) Appl. No.: 09/703,981

(22) Filed: Oct. 30, 2000

(51) Int. Cl.[7] .................................................. B60Q 1/44
(52) U.S. Cl. ....................... 340/479; 340/463; 340/464; 340/467
(58) Field of Search ................................ 340/479, 480, 340/463, 464

(56) References Cited

U.S. PATENT DOCUMENTS

| | | | | |
|---|---|---|---|---|
| 3,559,205 A | * | 1/1971 | Colby | 340/279 |
| 4,886,460 A | * | 12/1989 | Olgren | 439/15 |
| 5,463,258 A | * | 10/1995 | Filion et al. | 307/10.1 |
| 5,663,706 A | * | 9/1997 | Francis | 340/464 |
| 5,874,892 A | * | 2/1999 | Antonellis et al. | 340/438 |

* cited by examiner

*Primary Examiner*—Jeffery Hofsass
*Assistant Examiner*—Son Tang
(74) *Attorney, Agent, or Firm*—Timothy Thut Tyson; Ted Masters; Freilich, Hornbaker & Rosen

(57) ABSTRACT

A brake early warning system for a vehicle is disclosed. The vehicle has (1) a steering column assembly (500) having a plurality of components, and (2) a vehicle broadcast system, which includes brake lights, a horn, and headlights. The brake early warning system includes a movement sensor (20) which is connected to the steering column assembly (500), and senses relative movement between two of the steering column assembly (500) components when a driver braces against the steering wheel (508) in an urgent braking situation. In such cases, movement sensor (20) senses relative movement, and generates a signal which activates the brake lights, horn, and headlights, thereby alerting any following driver, as well as others in the vicinity, that the vehicle has commenced rapid braking.

8 Claims, 7 Drawing Sheets

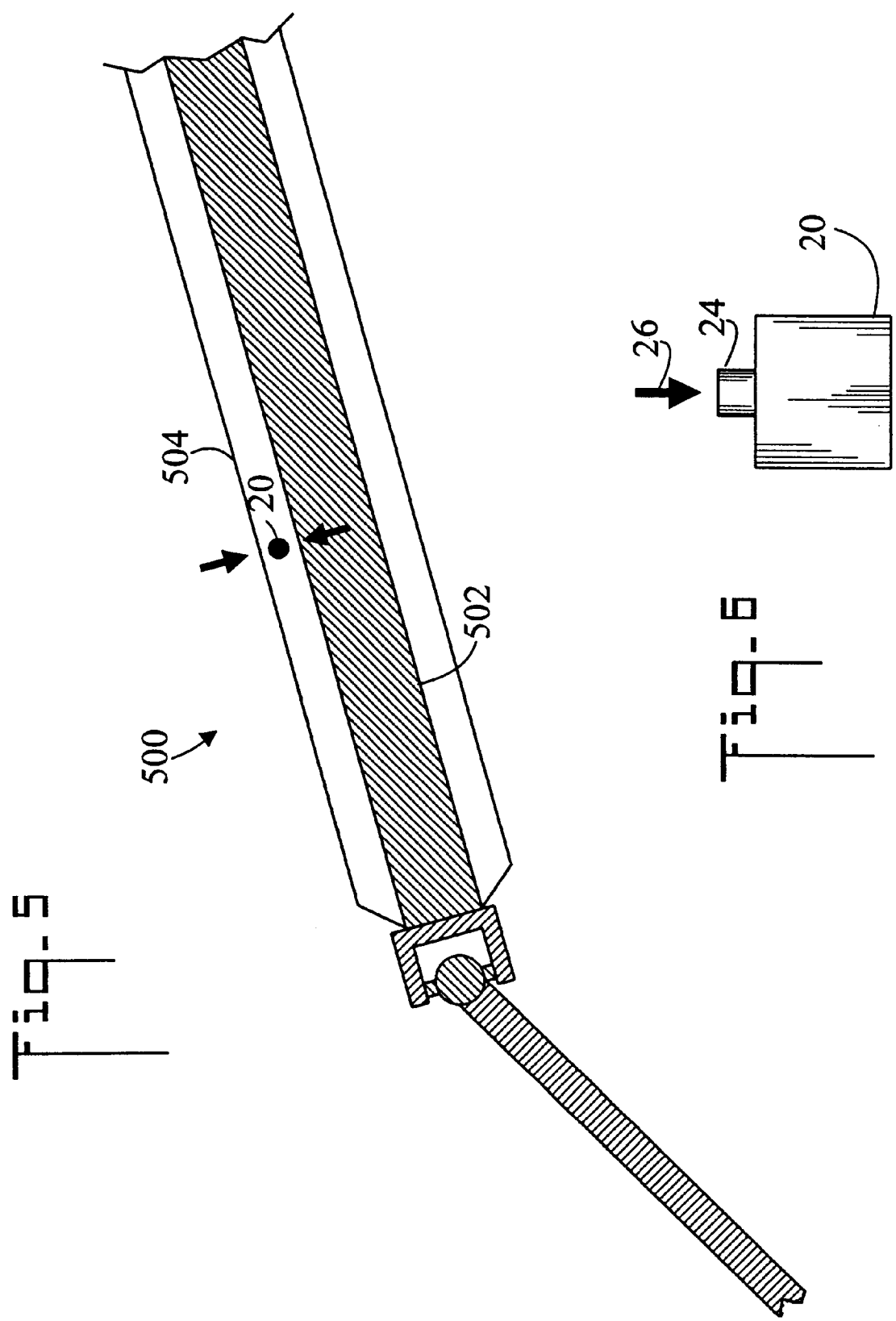

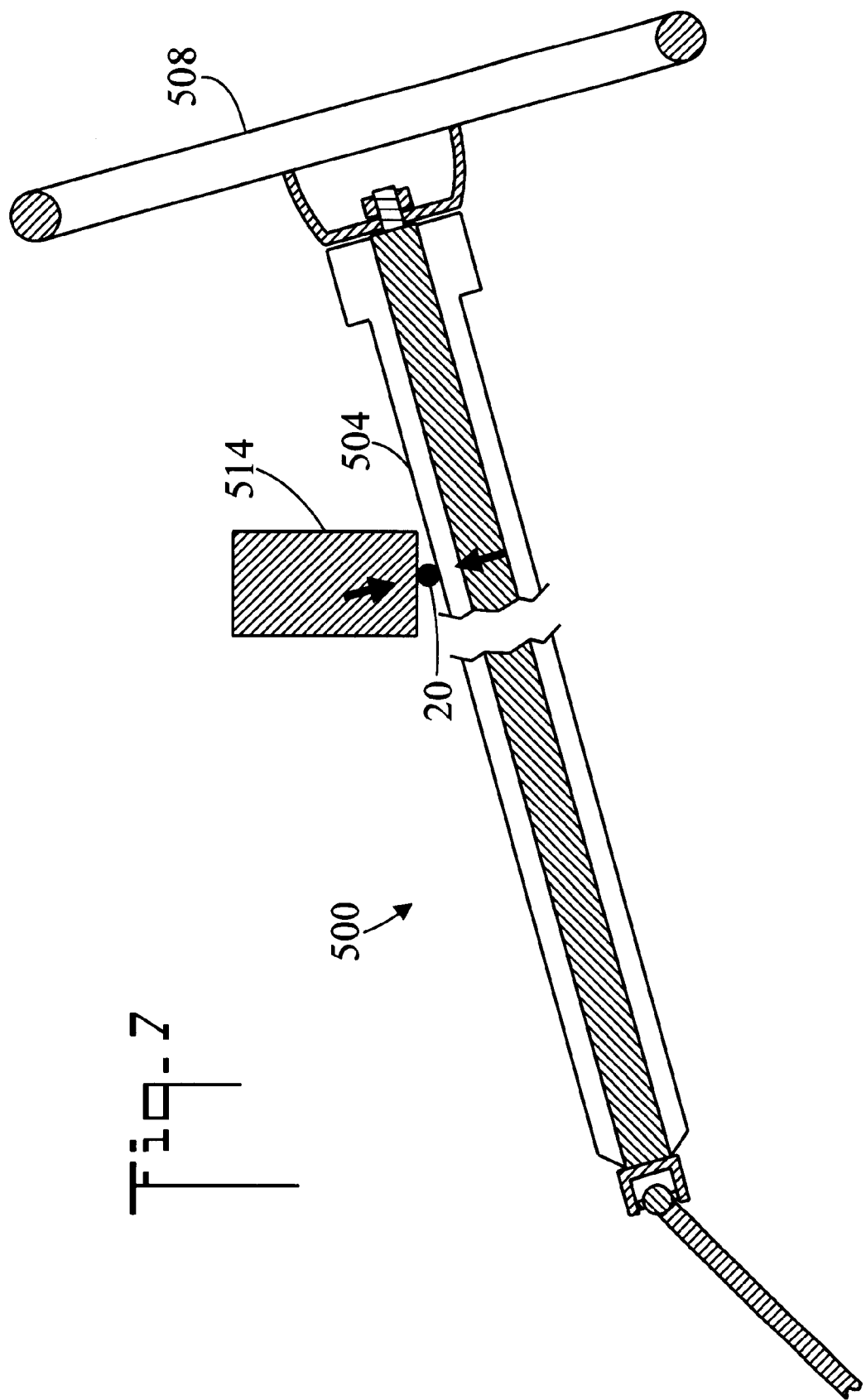

BRAKE EARLY WARNING SYSTEM AND METHOD OF USE

TECHNICAL FIELD

The present invention pertains generally to vehicles such as cars, trucks, vans, and the like, and more particularly to a brake early warning system which alerts others that the vehicle is braking, and does so before the driver's foot is actually applied to the brake pedal.

BACKGROUND ART

All motor vehicles are equipped with brake lights which indicate that the brake pedal has been depressed, and therefore that the vehicle is braking. The brake lights serve to warn a following motorist that the vehicle is braking, and that the following driver should also in turn commence slowdown or braking. Unfortunately, when the rear car is following too close considering the speed of both vehicles, the activation of the brake lights comes too late to avoid an accident. Various prior art inventions have addressed this problem. For example, U.S. Pat. No. 5,442,333 shows an urgent braking device which connects in series with a brake light system of a vehicle. The device incorporates power modulating means connected in parallel with an inertial switch. The device is attached to the vehicle with the inertial switch in an orientation relative to the vehicle whereby the switch is normally closed. The switch opens when the vehicle is decelerating in excess of a predetermined rate. Upon opening, the switch interrupts power supplied to the brake light system and a power modulating means is activated, resulting in a modulated power signal supplied to the brake light system causing the brake lights to flash. U.S. Pat. No. 5,463,258 illustrates a steering wheel 12 which incorporates an air bag unit 22. The air bag unit has a cover door 30 with a transducer 38 molded in a deformable front wall 35 of the cover door. The transducer can be a force sensitive resistor 38 which is operably connected to an electrical circuit 42 that actuates a horn 44 when the circuit senses a change in the resistance of force sensitive resistor 38. The force sensitive resistor 38 produces a suitable change in resistance when hand pressure is exerted on the front wall 35. U.S. Pat. No. 5,874,892 defines a vehicle warning system for vehicles comprising a pressure activated switch disposed within the steering wheel for activating a transmitter when more than normal pressure is applied to the steering wheel. The vehicle warning system further comprises a warning unit which contains a receiver, a sound generator, and warning lights. When a driver is faced with a potentially dangerous situation and instinctively grips the steering wheel harder, this causes the vehicle warning system to transmit of signals to the receiver in the warning unit of the initiating vehicle as well as the receivers in the warning units of other vehicles within a predetermined distance. The transmitted signal causes the warning light to flash and warning sound to be generated from the warning unit in each of the vehicles receiving the transmitted signal. U.S. Pat. No. 5,969,434 discloses a circuit for activating automobile brake lights. The circuit includes a battery, rear lights, horn, horn switch, center brake light flasher, brake pedal switch, and dash indicator light. When the horn in activated, the brake lights come on. When the enter brake light flasher is activated, the middle brake light comes on. When the brakes are activated, the dash indicator light comes on.

DISCLOSURE OF INVENTION

The present invention is directed to a brake early warning system which provides an early alert to others that a vehicle is in the process of braking. When a driver senses an urgent need to brake, the driver will instinctively brace, and in so doing will push against the steering wheel. The pressure exerted by the driver will deflect certain components of the steering column assembly. In the present invention this deflection is sensed by a movement sensor, which senses the relative movement between steering column assembly components. The movement sensor then sends a signal to activate the vehicle's brake lights, and in a preferred embodiment, also the horn and headlights.

The bracing of the driver against the steering wheel occurs about 0.6 seconds before the driver depresses the brake pedal. Therefore, the present invention provides an increased margin of safety, particularly when the vehicle is travelling at higher speeds. The present invention can also alert others when a driver has slumped over the wheel, such as might be the case during sickness, a heart attack, or when asleep at the wheel.

The present invention can be enabled by the ignition system, so that it will not be active as the driver grasps the steering wheel while entering and exiting the vehicle. Also, the present invention can be utilized to alert tailgaters that they are following too close. In such situations, rather than stepping on the brake, the driver can simply push against the steering wheel to activate the brake lights.

In accordance with a preferred embodiment of the invention, a vehicle has (1) a steering column assembly having a plurality of components, and (2) a vehicle broadcast system which includes brake lights, a horn, and headlights. A brake early warning system includes a movement sensor which is connected to the steering column assembly. The movement sensor senses relative movement between two of the steering column assembly components, so that when the movement sensor senses relative movement, a signal is generated which activates the vehicle broadcast system.

In accordance with an important aspect of the invention, the steering column assembly components including a steering shaft, a steering column tube, and a steering assembly, and the movement sensor senses relative movement between two of these components.

In accordance with an important feature of the invention, the movement sensor includes a mechanical switch.

In accordance with another important aspect of the invention, the movement sensor senses movement when a driver pushes upon the steering wheel and thereby deflects certain of the steering column assembly components.

In accordance with another important feature of the invention, when the movement sensor senses movement, it deactivates the vehicle's cruise control system.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 5 is an enlarged view of the bottom portion of the steering column assembly;

FIG. 6 is an enlarged side elevation view of a mechanical switch;

FIG. 7 is a side elevation cross-sectional view of an alternative embodiment; and, FIG. 8 is a graph showing vehicle stopping distance for a following driver as a function of speed.

MODES FOR CARRYING OUT THE INVENTION

Figure 1:
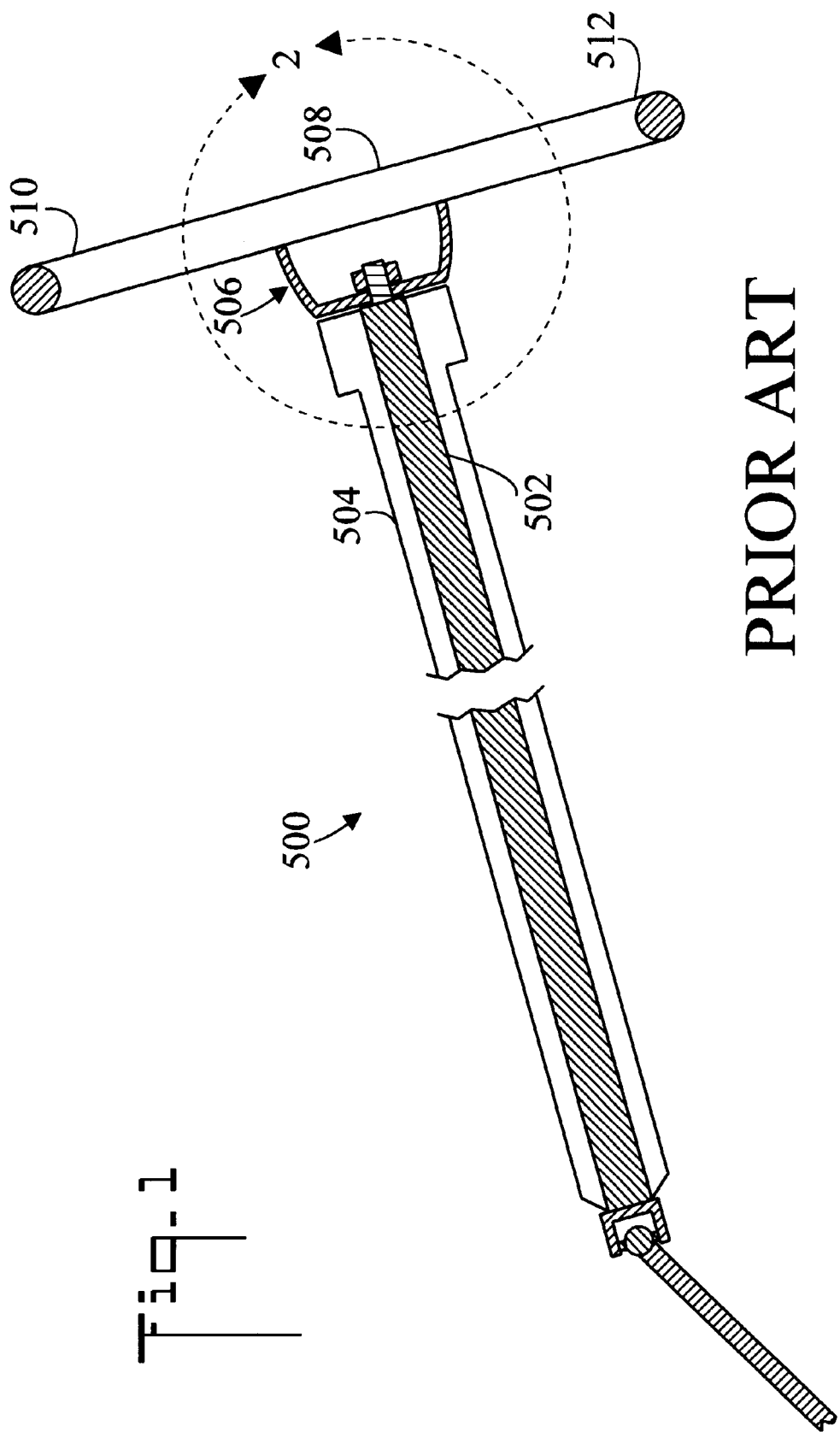
FIG. 1 is a side elevation cross-sectional view of a prior art steering column assembly.

Referring initially to FIG. 1, there is illustrated a simplified side elevation cross-sectional view of a prior art steering column assembly, generally designated as 500. Steering column assembly 500 has a plurality of components. These include a steering shaft 502, a steering column tube 504, and a steering assembly 506. Steering assembly 506 in turn includes a steering wheel 508 having a top portion 510 and a bottom portion 512. It may be appreciated that the steering column assembly 500 depicted in FIG. 1 is for a typical vehicle, and that design variations and other components could also be included.

Figure 2:
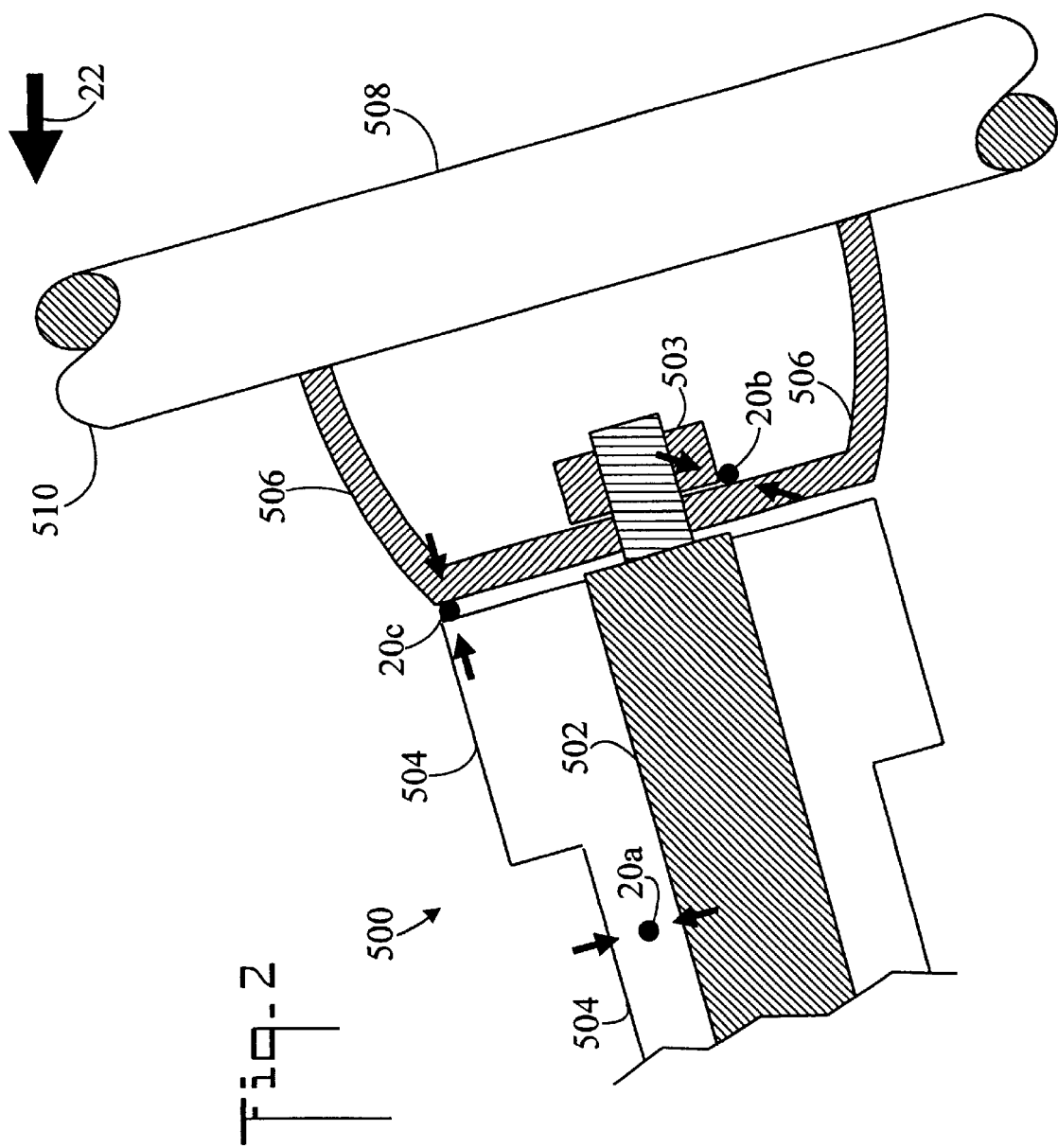
FIG. 2 is an enlarged view of the area 2 of FIG. 1.

Now referring to FIG. 2, there is illustrated an enlarged view of area 2 of FIG. 1. A movement sensor 20 is connected to the steering column assembly 500. The movement sensor 20 may be placed in any of the three depicted locations. The movement sensor senses relative movement between two of the steering column components, so that when movement sensor 20 senses relative movement, a signal is generated which activates a vehicle broadcast system. Movement sensor 20 senses movement when a driver pushes in direction 22 upon the top portion 510 of steering wheel 508 thereby causing deflection in steering column assembly 500. Movement sensor 20 senses relative movement between any two of the steering shaft 502, the steering column tube 504, and the steering assembly 508. For example, movement sensor 20a senses relative movement between steering shaft 502 and the steering column tube 504 in the direction indicated by the double arrows. Pushing on the top portion 510 of steering wheel 508 in direction 22 causes steering shaft 502 to move upward slightly with respect to steering column tube 504. Similarly, movement sensor 20b senses relative movement between steering shaft 502 (nut 503 is a portion of steering shaft 502) and steering assembly 508. Pushing on the top portion 510 of steering wheel 508 in direction 22 causes steering shaft 502 and steering assembly 508 to move slightly together. And, movement sensor 20c senses relative movement between steering column tube 504 and steering assembly 506. Pushing on the top portion 510 of steering wheel 508 in direction 22 causes steering assembly 506 to move toward steering column tube 504. It may be appreciated that movement sensor 20 can be located at any convenient point or points on steering column assembly 500 where deflection and thereby relative movement is occasioned by exerting force upon the top portion 510 or bottom portion 512 of steering wheel 508. The optimum locations will of course vary in different vehicle makes and models.

Figure 3:
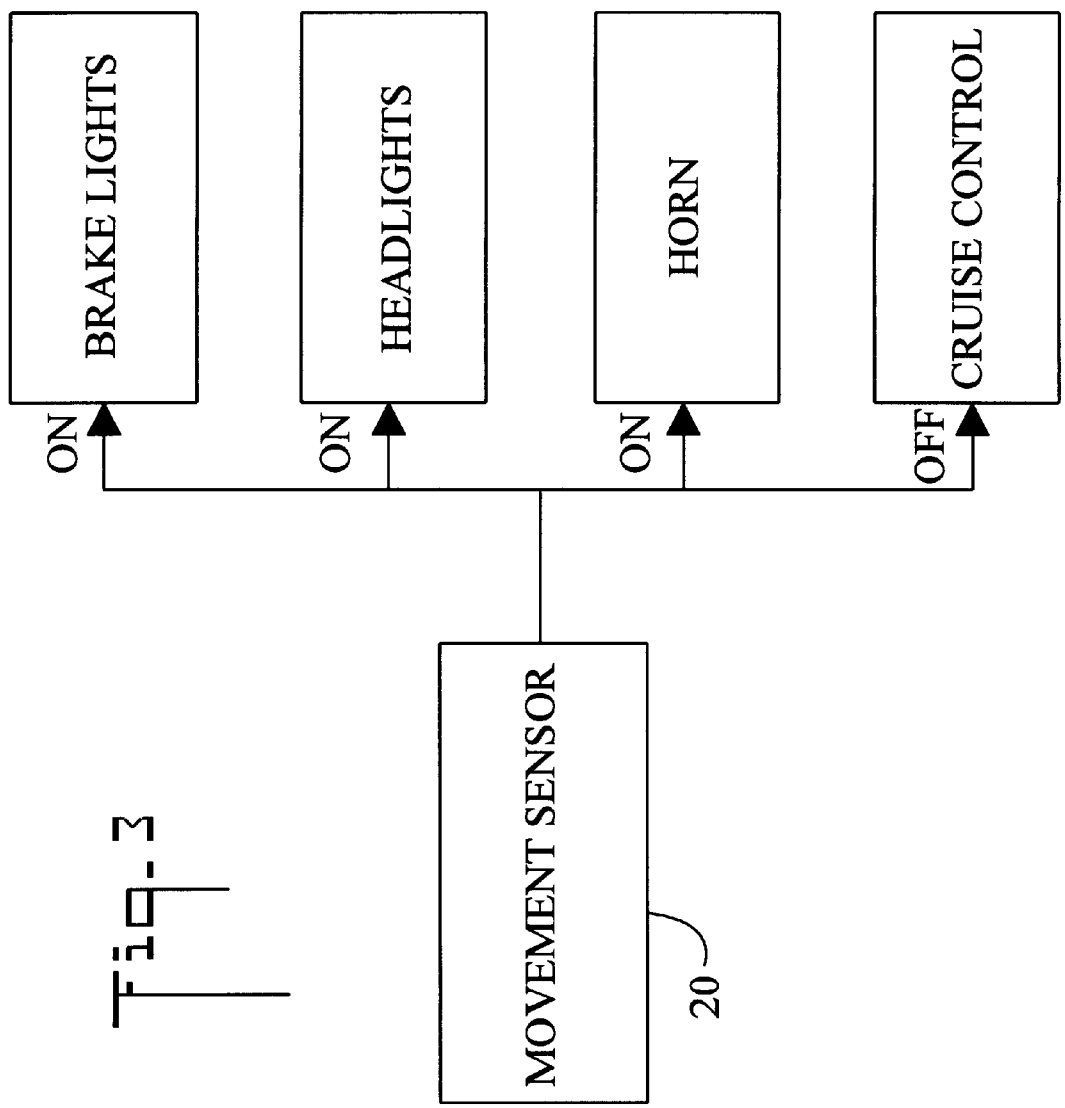
FIG. 3 is a block diagram of a movement sensor sending a signal to various vehicle systems.

FIG. 3 is a block diagram of movement sensor 20 sending a signal to various vehicle systems. The vehicle systems include a vehicle broadcast system, which in turn includes at least one of brake lights, headlights, and a horn. When the movement sensor 20 senses movement, at least one of the vehicle broadcast system elements is activated or turned on. The vehicle systems also include a cruise control system. When movement sensor 20 senses movement, it generates a signal which deactivates (turns off) the cruise control system. In an alternative embodiment, when the cruise control system is deactivated, the brake lights will intermittently flash.

Figure 4:
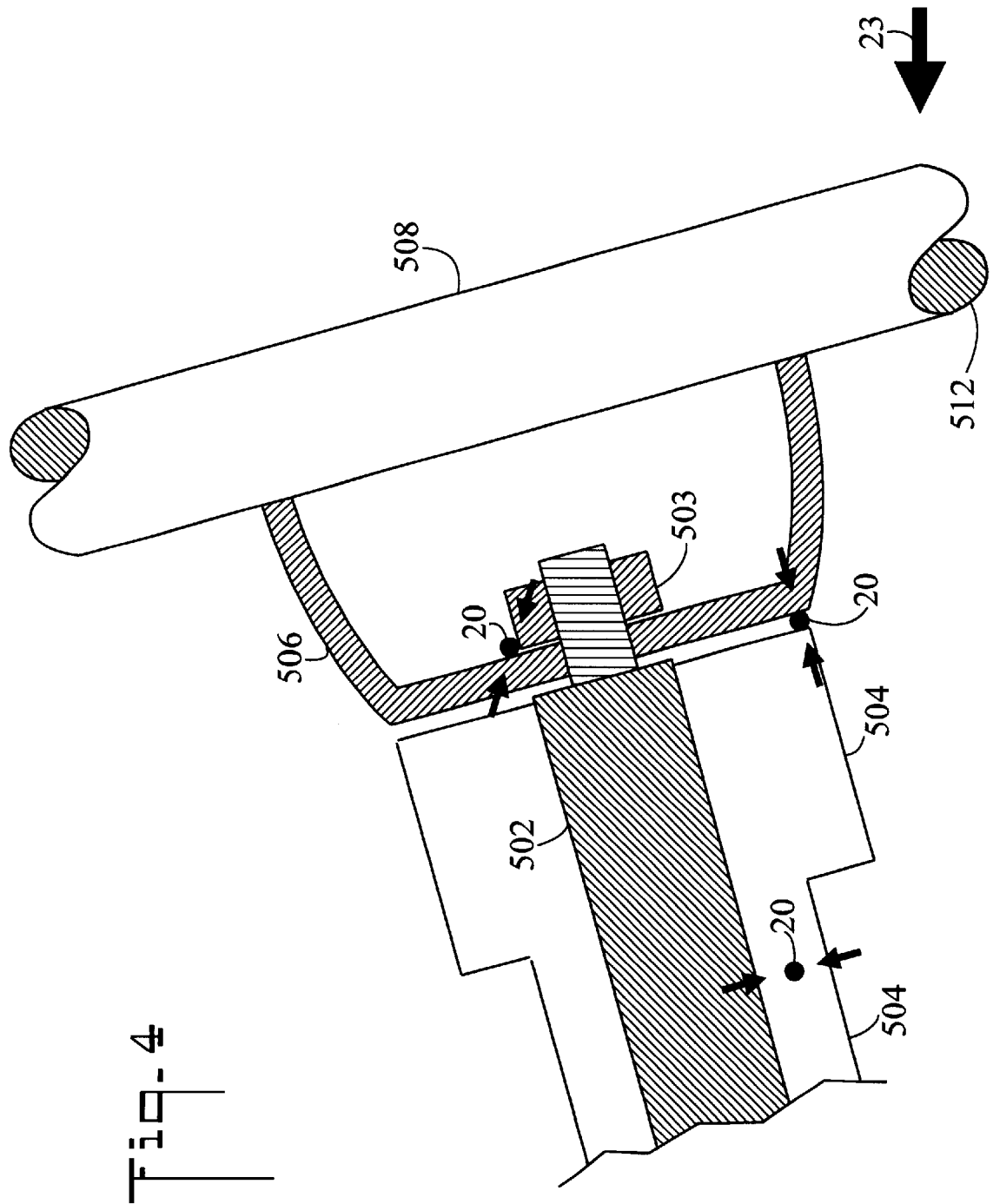
FIG. 4 is an enlarged view of the area 2 of FIG. 1.

FIG. 4 is an enlarged view of the area 2 of FIG. 1, showing movement sensors 20, and relative movement when a driver pushes in direction 23 upon the bottom portion 512 of steering wheel 508.

FIG. 5 is an enlarged view of the bottom portion of the steering column assembly 500. Movement sensor 20 could also be located as shown, sensing relative motion between steering shaft 502 and steering column tube 504.

FIG. 6 is an enlarged side elevation view of a mechanical switch embodiment of movement sensor 20. Movement sensor 20 comprises a small, normally off, micro-switch, the contacts of which momentarily close when force to a plunger 24 is applied in direction 26. Movement sensor 20 is selected so that a very small movement will activate the sensor. Movement sensor 20 is mounted on a first component of steering column assembly 500 and is activated when, due to deflection, a closely adjacent second component moves toward the first component and exerts force upon plunger 24.

FIG. 7 is a side elevation cross-sectional view of an alternative embodiment of the present invention. In this embodiment, the vehicle has (1) a steering column assembly 500, (2) a stationary assembly 514 (such as a dashboard), and (3) a vehicle broadcast system. Movement sensor 20 is connected between the steering column assembly 500 and the stationary assembly 514, sensing relative movement between the steering column assembly 500 and the stationary assembly 514. So that, when movement sensor 20 senses relative movement, a signal is generated which activates the vehicle broadcast system.

Figure 8:
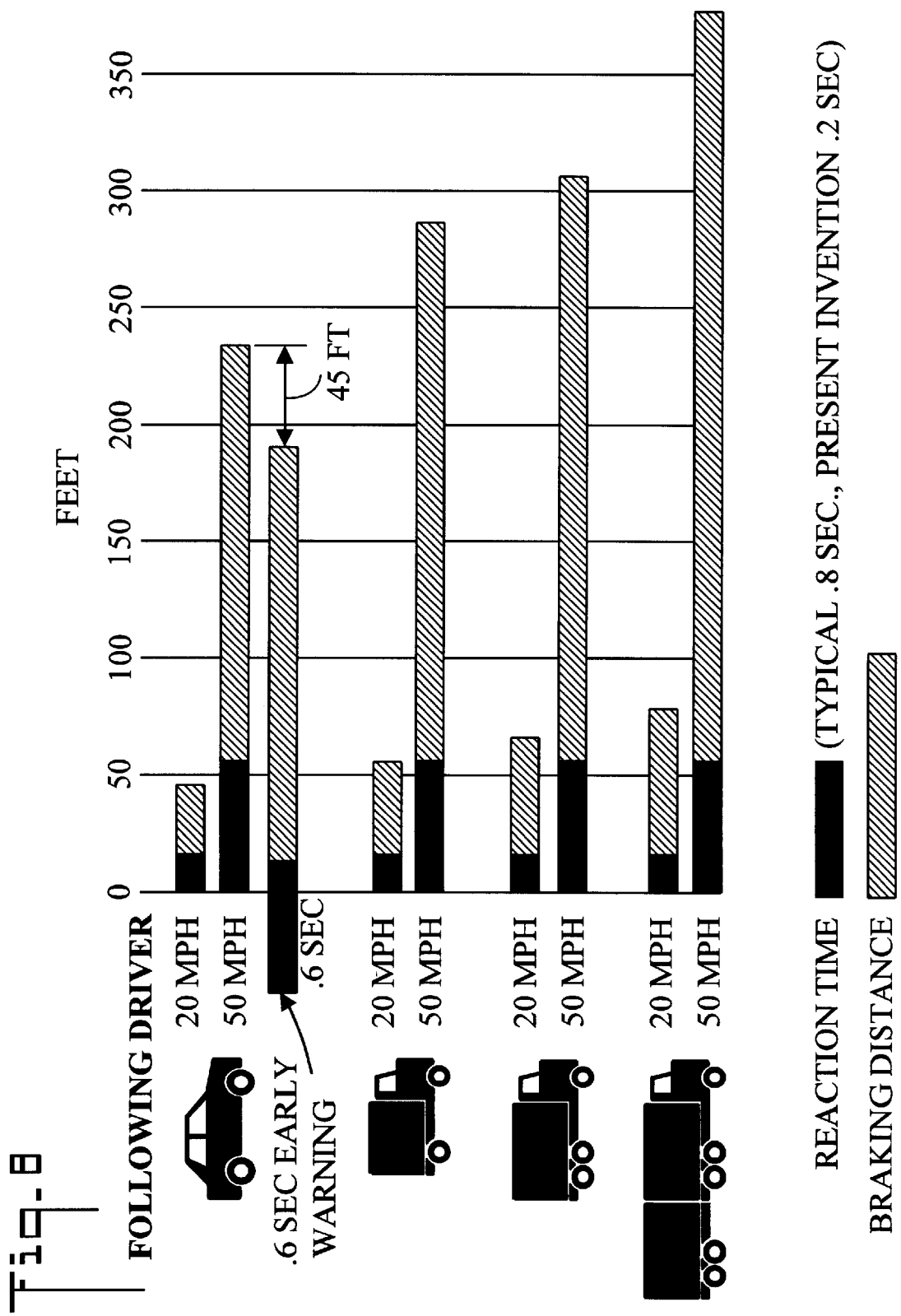

FIG. 8 is a graph showing vehicle stopping distance for a following driver as a function of speed. In an urgent braking situation, the typical driver reaction time to lift the right foot off of the accelerator and depress the brake pedal is about 0.8 seconds. However, the typical reaction time for the driver to brace or pushing against the steering wheel is about 0.2 seconds. Therefore, the movement sensor 20 of the present invention provides the following driver with an early warning which is 0.6 seconds prior to that provided by depressing the brake pedal. At 50 MPH, 0.6 seconds equates to a reduction in stopping distance of a following vehicle of about 45 feet. At 60 MPH the benefit of the present invention increases to about 53 feet. Such an added margin of safety could prevent many accidents.

An important feature of the present invention, is that movement sensor 20 is not located on the steering wheel 508, as is the case for certain prior art devices. The present invention capitalizes upon deflections and relative movement of components in the steering column assembly 500, and does not depend upon transducers located in or on the steering wheel 508 itself.

In terms of use, a method of warning others that a vehicle is braking comprises:

(a) providing the vehicle with (1) a steering column assembly 500, the steering column assembly including a steering assembly 506 having a steering wheel 508, the steering wheel 508 having a top portion 510 and a bottom portion 512, and (2) a vehicle broadcast system, (b) providing a movement sensor 20 connected to the steering column assembly 500, said movement sensor sensing movement when a driver pushes upon either the top portion 510 or the bottom portion 512 of the steering wheel 508;

(c) the driver pushing upon either the top portion 510 of the bottom portion 512 of the steering wheel 508, and, (d) the movement sensor 20 generating a signal which activates the vehicle broadcast system.

The preferred embodiments of the invention described herein are exemplary and numerous modifications, dimensional variations, and rearrangements can be readily envisioned to achieve an equivalent result, all of which are intended to be embraced within the scope of the appended claims.

I claim:

1. A brake early warning system for a vehicle, the vehicle having (1) a steering column assembly having a plurality of components, and (2) a vehicle broadcast system, said brake early warning system comprising:

at least one movement sensor connected to the steering column assembly;

the steering column assembly components including a steering shaft, a steering column tube, and a steering assembly having a steering wheel;

said movement sensor sensing relative deflective movement between at least one of (1) the steering shaft and the steering column, (2) the steering shaft and the steering column tube, and (3) the steering column and the steering column tube;

so that when a driver pushes against the steering wheel certain of the steering column components are deflected thereby causing relative deflective movement between two of the steering column components; and, said movement sensor sensing said relative deflective movement, and generating a signal which activates the vehicle broadcast system.

2. A brake early warning system according to claim 1, further including:

said movement sensor including a mechanical switch; and, said movement sensor sensing relative deflective movement between the steering shaft and the steering column tube.

3. A brake early warning system according to claim 1, further including:

said movement sensor including a mechanical switch; and, said movement sensor sensing relative deflective movement between the steering shaft and the steering assembly.

4. A brake early warning system according to claim 1, further including:

said movement sensor including a mechanical switch; and, said movement sensor sensing relative deflective movement between the steering column tube and the steering assembly.

5. A brake early warning system according to claim 1, the vehicle having a cruise control system, said brake early warning system further including:

said movement sensor generating a signal which deactivates the cruise control system.

6. A brake early warning system according to claim 5, further including:

the vehicle having brake lights; and, when the cruise control system is deactivated, the brake lights intermittently flash.

7. A brake early warning system for a vehicle, the vehicle having (1) a steering column assembly, (2) a stationary assembly, and (3) a vehicle broadcast system, said brake early warning system comprising:

a movement sensor connected between the steering column assembly and the stationary assembly, said movement sensor sensing relative deflective movement between the steering column assembly and the stationary assembly;

said movement sensor including a mechanical switch; and, so that when said movement sensor senses relative deflective movement, a signal is generated which activates the vehicle broadcast system.

8. A method of warning others that a vehicle is braking, comprising:

providing the vehicle with a (1) steering column assembly, the steering column assembly including (a) a steering assembly having a steering wheel, the steering wheel having a top portion and a bottom portion, (b) a steering shaft, and (c) a steering column tube; and (2) a vehicle broadcast system;

providing a movement sensor connected to the steering column assembly, said movement sensor sensing deflective movement between at least one of (1) the steering assembly and the steering shaft, (2) the steering assembly and the steering column tube, and (3) the steering shaft and the steering column tube, when a driver pushes upon either the top portion or the bottom portion of the steering wheel;

the driver pushing upon either the top portion or the bottom portion of the steering wheel; and, said movement sensor generating a signal which activates the vehicle broadcast system.

* * * * *